(12) United States Patent
Wauke

(10) Patent No.: US 6,775,096 B2
(45) Date of Patent: Aug. 10, 2004

(54) CHUCKING DEVICE FOR A MAGNETIC DISK

(75) Inventor: Tomokuni Wauke, Fukushima-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 53 days.

(21) Appl. No.: 10/224,902

(22) Filed: Aug. 21, 2002

(65) Prior Publication Data

US 2003/0039059 A1 Feb. 27, 2003

(30) Foreign Application Priority Data

Aug. 24, 2001 (JP) ........................................ 2001-254919

(51) Int. Cl.[7] ............................................. G11B 17/02
(52) U.S. Cl. ................................................. 360/99.04
(58) Field of Search ............................ 360/99.04, 99.05, 360/99.08, 99.12; 369/270, 271, 290, 291

(56) References Cited

U.S. PATENT DOCUMENTS

| | | | | |
|---|---|---|---|---|
| 4,697,216 A | * | 9/1987 | Tsukahara | 360/99.12 |
| 4,855,850 A | * | 8/1989 | Nagaoka et al. | 360/99.12 |
| 5,138,606 A | * | 8/1992 | Nishizawa | 369/270 |
| 5,311,383 A | * | 5/1994 | Yokouchi | 360/99.08 |
| 5,357,387 A | * | 10/1994 | Kawana | 360/99.05 |
| 5,610,779 A | * | 3/1997 | Kawana | 360/99.04 |
| 5,648,881 A | * | 7/1997 | Yokouchi | 360/99.04 |
| 5,701,217 A | * | 12/1997 | Yokouchi | 360/99.05 |
| 6,208,487 B1 | | 3/2001 | Furuki | |
| 6,243,229 B1 | * | 6/2001 | Furuki | 360/99.04 |
| 6,377,421 B1 | * | 4/2002 | Katagiri et al. | 360/99.04 |

FOREIGN PATENT DOCUMENTS

| EP | 1 061 512 | | 12/2000 |
|---|---|---|---|
| EP | 1061512 | * | 12/2000 |

* cited by examiner

Primary Examiner—A. J. Heinz
Assistant Examiner—Angel Castro
(74) Attorney, Agent, or Firm—Brinks Hofer Gilson & Lione

(57) ABSTRACT

A chucking device for a magnetic disk that includes a substantially disk-shaped bearing and a drive arm extending in a rear side of a rotor yoke along a circumferential direction and loosely suspended from and held by a rotor yoke on both ends. An inner peripheral surface for restraining movement toward a bearing is formed at the drive arm, and a drive pin loosely passing through a drive pin through hole of the rotor yoke to extend upward and loosely inserted into a drive hole of a magnetic disk is formed at a front part of the drive arm in a rotor yoke rotation direction. When the rotor yoke having the magnetic disk placed thereon is rotated, the inner peripheral surface of the drive arm comes away from the bearing, and the drive pin comes in contact with a front edge and an outside edge of the drive hole.

4 Claims, 4 Drawing Sheets

CHUCKING DEVICE FOR A MAGNETIC DISK

BACKGROUND OF THE INVENTION

1. Field of the Invention

The present invention relates to a chucking device for a magnetic disk.

2. Description of the Related Art

A magnetic disk typified by a flexible disk is loaded, in the form of a disk cartridge in which a thin film recording disk is received in a case into a magnetic disk drive device. The recording disk is rotated in this magnetic disk drive device, and input/output of recording is carried out through a writing/reading window with a shutter, which is bored in the case. This recording disk must be easily attached/detached while it is received in the case. Further, it must be accurately aligned with a rotating shaft of the magnetic disk drive device at writing/reading, and the rotating speed must be accurately controlled. Thus, conventionally, a chucking device shown in FIG. 7 and FIG. 8 is used in the magnetic disk drive device.

A center hub made of a ferromagnetic metal disk or the like is fitted to the center part of the recording disk of the flexible disk. In FIGS. 7 and 8, this center hub 2 is provided with a substantially square center hole 3 at its center part, and a substantially rectangular drive hole 4 at its peripheral part. This drive hole 4 includes a front edge 4a at the front in a rotor yoke rotation direction and an outside edge 4b in a direction (hereinafter referred to as "outward" in the present specification) away from the rotation center of the rotor yoke.

On the other hand, the magnetic disk drive device is provided with a rotor yoke 101 made of a ferromagnetic metal disk and rotationally driven by a motor (not shown) in a constant direction (denoted by "D" in the drawing), and a magnetic disk (chucking magnet) 102 is fixed thereon.

A center shaft 103 is provided in a standing manner at the rotation center O of the rotor yoke 101. This center shaft 103 extends through an opening 102a of the center part of the magnetic disk 102 and is loosely inserted into the center hole 3 of the center hub.

In the present specification, "loosely" means a state in which a free movement can be made within a predetermined range in the horizontal direction and the vertical direction.

A drive pin through hole 104 is formed into an arc shape along a circumference at a peripheral part of the rotor yoke 101. A chucking arm 105 molded into an arc shape along the circumference is fitted in the drive pin through hole 104. The chucking arm 105 is provided with a drive pin 106 extending upward at a tip part (hereinafter referred to as "front part") 105a directed toward a rotation direction D of the rotor yoke 101. This drive pin 106 loosely passes through a front opening 102b formed in the magnetic disk 102 and is loosely inserted into the drive hole 4 of the center hub.

On the other hand, a fixing hole 105c is provided at the other end (hereinafter referred to as "rear part") 105b of the chucking arm 105. Further, a hole part 101a corresponding to the fixing hole 105c is also provided in the rotor yoke 101 and the magnetic disk 102. A fixing pin 101b passing through the fixing hole 105c and the hole part 101a locks the chucking arm 105 to the rotor yoke 101. The chucking arm 105 can swing with this fixing pin 101b as the center in the horizontal direction within the range of the width of the drive pin through hole 104.

When the flexible disk is loaded in this magnetic disk drive device, the recording disk is placed on the rotor yoke 101. The center hub 2 fitted to the recording disk is magnetically attracted by the magnetic disk 102, and the center hole 3 of the center hub receives the center shaft 103 at the side of the rotor yoke. At this point, the drive pin 106 projecting upward from the magnetic disk 102 may or may not be inserted in the drive hole 4 of the center hub. In case the magnetic disk 102 is not inserted, the center hub 2 presses the drive pin 106, which is pushed to the level of the lower surface of the center hub 2.

Here, when a motor (not shown) makes at most one turn to the rotor yoke 101 in the D direction, the top of the drive pin 106 slides and rotates on the lower surface of the center hub, and is received into the drive hole 4 and raised. When the rotor yoke 101 is further rotated in the D direction in this state, the chucking arm 105 is swung in the direction in which the drive pin 106 comes away from the rotation center O by the centrifugal force due to rotation of the rotor yoke 101. The drive pin 106 then comes in contact with the outside edge 4b of the drive hole 4 and swings and moves forward in the drive hole 4 through the rotating force of the rotor yoke 101. The drive pin 106 comes in contact with the front edge 4a of the drive hole 4 as well. As a result, the drive pin 106 comes in contact with two sides of the front edge 4a and the outside edge 4b of the drive hole 4 and is supported. This state is hereinafter referred to as "front/outside support".

At this time, the center shaft 103 comes in contact with two adjacent sides 3a and 3b of the center hole 3 of the center hub at the side facing the drive pin 106 across the rotation center O. In this state, the center of the recording disk coincides with the rotating shaft O of the rotor yoke 101 and chucking is completed. In this state, the recording disk of the flexible disk is not decentered and can accurately follow the controlled rotation speed of the rotor yoke 101 to rotate.

However, in the conventional chucking apparatus, the fixing pin 101b is used for the swing of the chucking arm 105 to realize the front/outside support of the drive pin 106, which increases the number of parts. Further, in order to manufacture this chucking apparatus, positioning and boring of the fixing hole 105c and the hole part 101a, caulking fixation of the fixing pin 101b and the like become necessary. These make manufacture and assembly troublesome and the manufacturing cost high.

SUMMARY OF THE INVENTION

The present invention provides a chucking device for a magnetic disk, which realizes a front/outside support by inexpensive means, prevents decentering rotation of a recording disk, and always enables accurate writing/reading.

To achieve the above object, the present invention adopts the following structure.

A chucking device for a magnetic disk of the invention comprises a substantially disk-shaped bearing provided on a surface of a base body and having an outer peripheral side surface, a rotor yoke disposed on the bearing and rotating in a constant direction while having a center hub of a magnetic disk placed thereon, a center shaft provided from the bearing to pass through a rotation center of the rotor yoke and loosely inserted into a center hole of the center hub, and a drive arm extending in a circumferential direction in a rear side of the rotor yoke and loosely suspended from and held by the rotor yoke at both ends thereof. The chucking device is characterized in that an inner peripheral surface for restraining the drive arm moving toward the bearing is formed along an outer peripheral side surface of the bearing at an inner peripheral side of the drive arm. A drive pin is formed at a front part of the drive arm in a rotor yoke rotation direction, which loosely passes through a drive pin through hole formed in the rotor yoke and extends toward a surface side of the rotor yoke, and is loosely inserted into a drive hole formed at a peripheral part of the center hub and having a front edge at a front part in the rotor yoke rotation direction and an outside edge in a direction away from a rotation center of the rotor yoke. A rear edge part of the drive pin through hole is enabled to come in contact with the drive pin. A locking flange for loosely locking the drive pin is provided at an outer edge part thereof. When the rotor yoke having the magnetic disk placed thereon is rotated, the inner peripheral surface of the drive arm comes away from the outer peripheral side surface, the drive pin is engaged with the locking flange, and the drive pin comes in contact with the front edge and the outside edge of the drive hole.

The chucking device for a magnetic disk of the invention is also characterized in that the drive arm is suspended from and held by the rotor yoke through a front flange capable of loosely engaging the locking flange of the drive pin through hole, a rear flange is formed at a rear part of the drive arm and placed on an upper surface of the rotor yoke behind the drive arm, and the inner peripheral surface is restrained by the outer peripheral side surface of the bearing.

Further, the chucking device of the invention is characterized in that the engagement of the front flange with the locking flange is kept in a state in which the inner peripheral surface of the drive arm is in contact with the outer peripheral side surface. A cutout part is formed at a front side of the drive pin in the rotation direction, which is engaged with the locking flange. Movement of the drive arm toward the front side in the rotation direction is restrained.

Since the inner peripheral surface for restraining the drive arm from moving toward the bearing side is formed at the inner peripheral side of the drive arm, the drive arm is not largely shifted to the bearing side. Thus, there is no risk that the drive arm will fall off from the rotor yoke although the drive arm is not fixed by a fixing pin.

Also, when the rotor yoke having the magnetic disk placed thereon is rotated, the drive arm and the bearing do not swing mutually and the rotation of the rotor yoke is not hindered since the inner peripheral surface of the drive arm comes away from the bearing. At the same time, the abrasion of the drive arm itself can be prevented.

Even if the rotor yoke is rotated and the inner peripheral surface of the drive arm comes away from the outer peripheral side surface, there is no risk that the drive arm will fall off from the rotor yoke since the drive pin is engaged with the locking flange.

Moreover, since the drive arm is suspended from and held by the rotor yoke through the front flange, the rear flange, and the inner peripheral surface, the drive arm is easily swung to the outer peripheral side by the centrifugal force generated by the rotation of the rotor yoke, and the front/outside support can be realized.

Further, even when the inner peripheral surface of the drive arm is in contact with the outer peripheral side surface, there is no risk that the drive arm will fall off from the rotor yoke since the front flange is engaged with the locking flange.

Furthermore, the cutout is formed at the front of the drive arm in the rotation direction, and this cutout is engaged with the locking flange so the movement of the drive arm toward the front side in the rotation direction is restrained. Thus, the drive arm can be certainly suspended from and held by the rotor yoke, and the drive arm does not fall off from the rotor yoke.

DETAILED DESCRIPTION OF THE PREFERRED EMBODIMENTS

The embodiments of the invention are described below with reference to the drawings.

Figure 1:
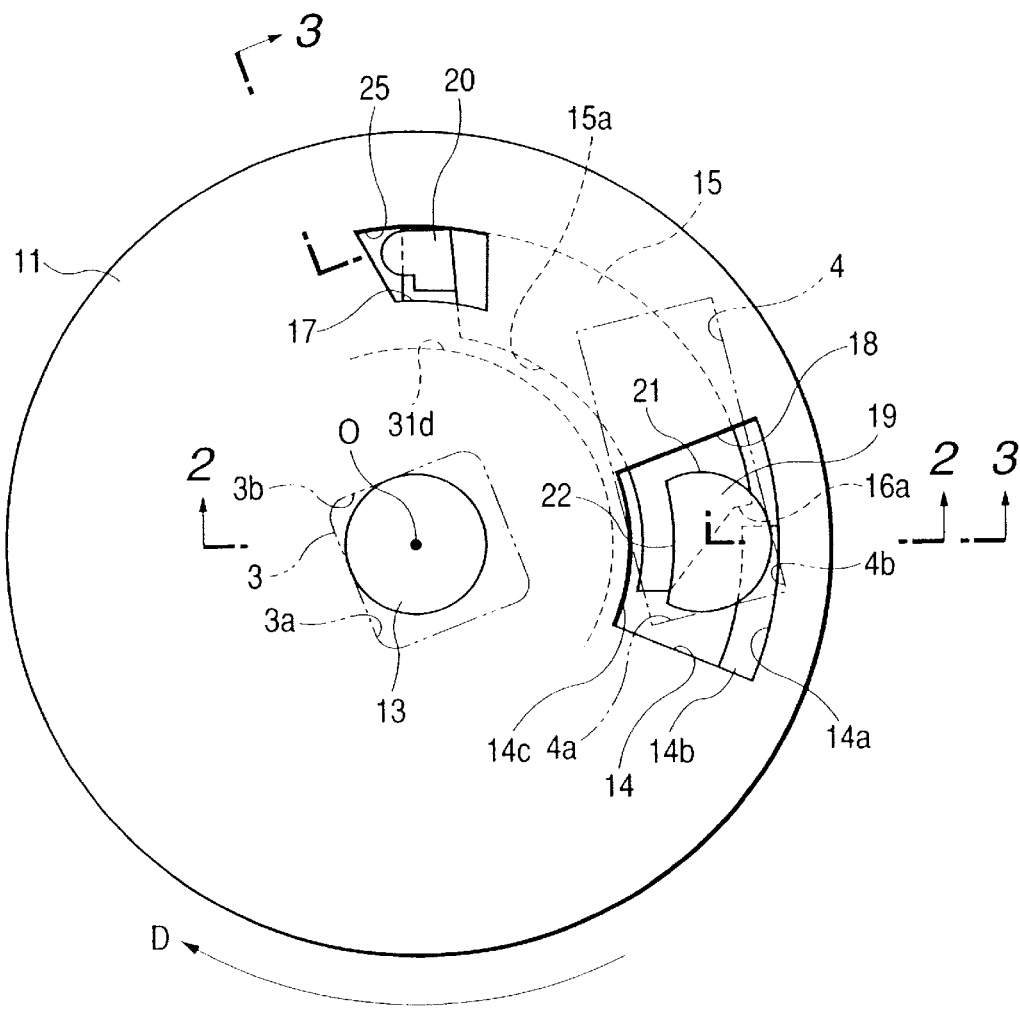
FIG. 1 is a view showing a chucking device for a magnetic disk of an embodiment of the invention.
Figure 2:
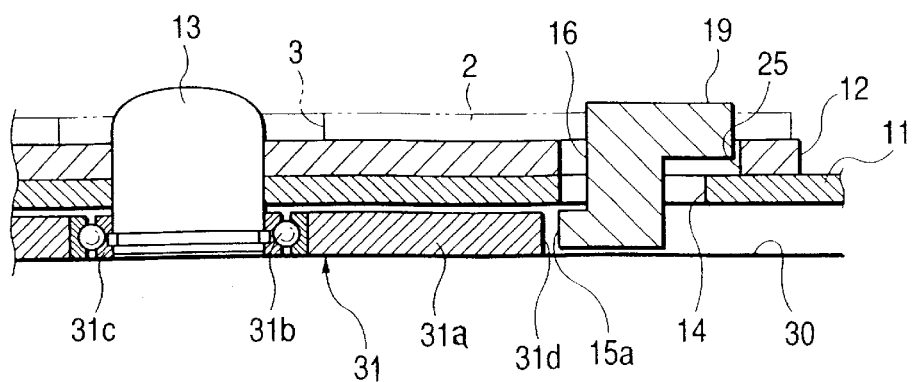
FIG. 2 is a sectional view taken along line 2—2 of FIG. 1.
Figure 3:
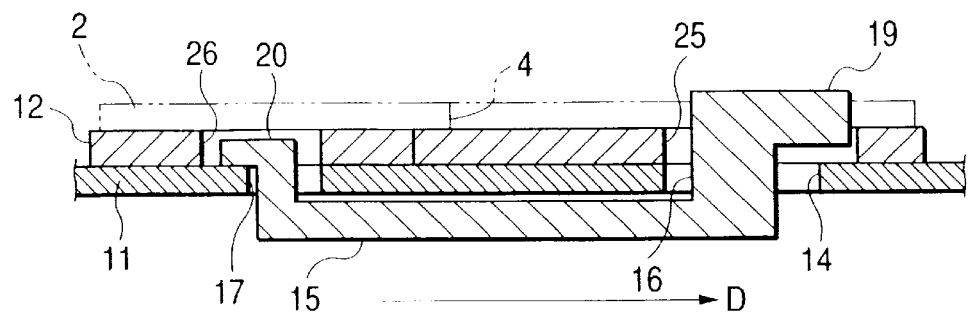
FIG. 3 is a sectional view taken along line 3—3 of FIG. 1.

FIGS. 1 to 3 show part of a magnetic disk drive device including a chucking device for a magnetic disk of the invention. FIG. 1 is a view of the chucking device for the magnetic disk, FIG. 2 is a sectional view taken along line 2—2 of FIG. 1, and FIG. 3 is a sectional view taken along line 3—3 of FIG. 1.

Figure 7:
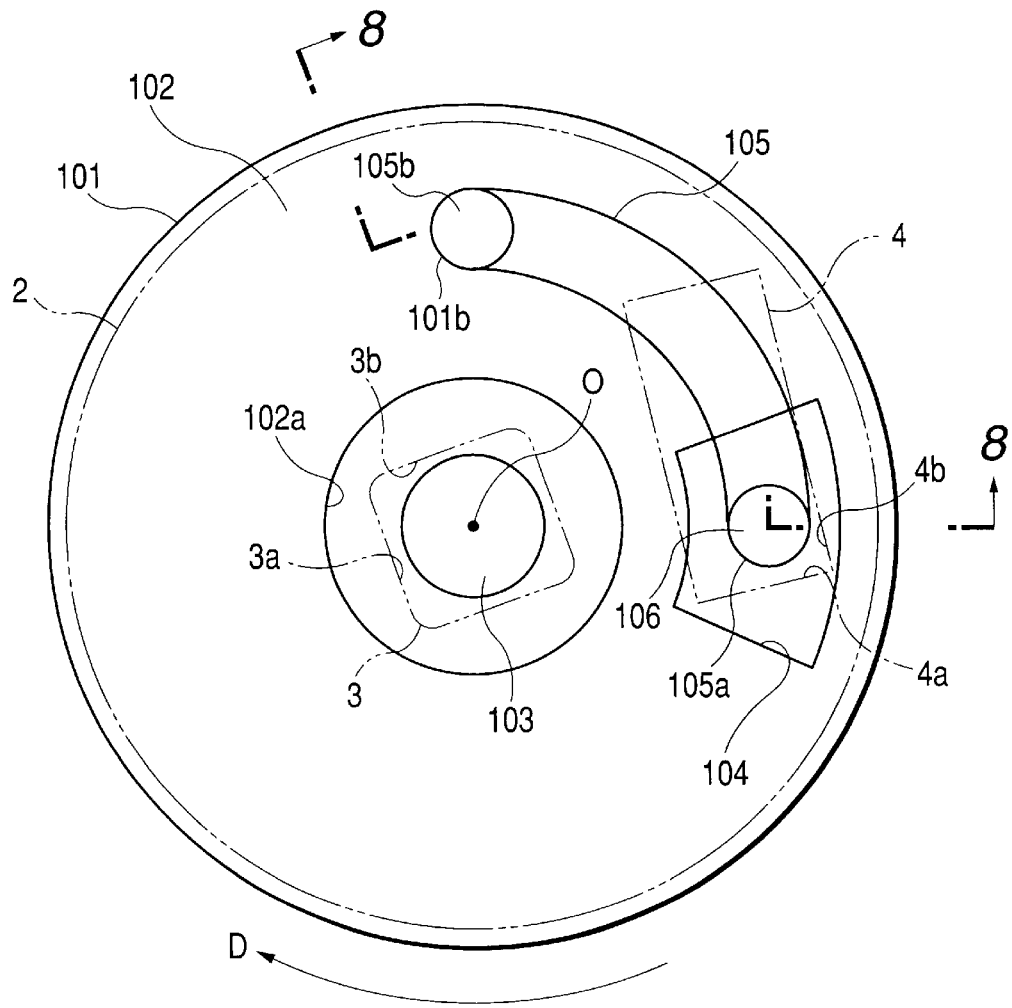
FIG. 7 is a view showing an example of a conventional chucking device for a magnetic disk.
Figure 8:
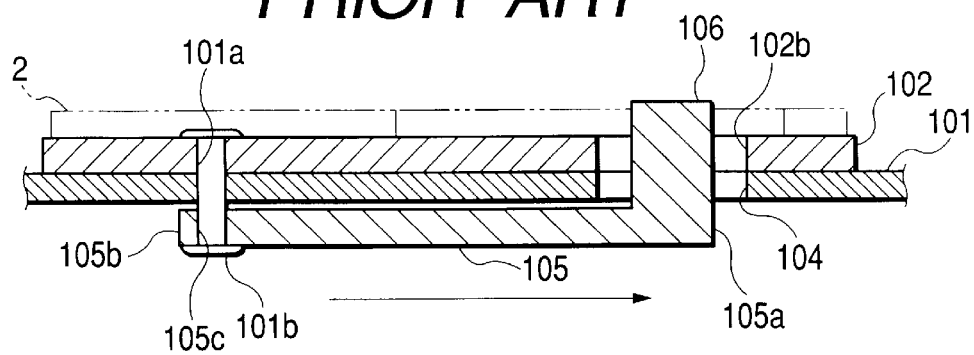
FIG. 8 is a sectional view taken along an arc line 8—8 of FIG. 7.

For convenience, a magnetic disk 12 shown in FIG. 2 is omitted in FIG. 1. In the following description, common conventional structural elements described by use of FIGS. 7 and 8 are designated by the same numbers and their explanation is either omitted or shortened.

In FIGS. 1 to 3, the magnetic disk drive device includes a rotor yoke 11 made of a ferromagnetic metal disk and rotationally driven by a motor (not shown) in the D direction. A magnetic disk (chucking magnet) 12 is fixed thereon. A center shaft 13 is provided in a standing manner at a rotation center O of the rotor yoke 11. This center shaft 13 is inserted through an opening (not shown) of the center part of the magnetic disk 12. When a flexible disk is placed, it is loosely inserted into a center hole 3 formed in a center hub 2. Further, a base end side of the center shaft 13 is inserted in a bearing 31 provided on a base body 30. The bearing 31 is constituted by, for example, a disk-shaped bearing body 31a, a ball bearing 31b, and a bearing retainer 31c. An outer peripheral side surface 31d of the bearing body 31a extends in a vertical direction relative to the surface of the base body 30. The bearing 31 is not limited to the ball bearing as shown in FIG. 3. For example, bearing 31 can be a slide bearing.

A drive pin through hole 14 and a drive arm receiving hole 17 are formed in the peripheral part of the rotor yoke 11 along the circumference from the front in sequence in the rotation direction D. An arc-shaped drive arm 15 shown in FIG. 4 extends over this drive pin through hole 14 and the drive arm receiving hole 17 in the circumferential direction under the rear side of the rotor yoke 11. The arc-shaped drive arm 15 is loosely suspended from the rotor yoke 11 at both ends thereof. As described later in detail, this suspension is carried out by a front flange 19 formed at an upper part of the drive pin 16 and a rear flange 20 formed at a rear part of the drive arm.

Figure 4:
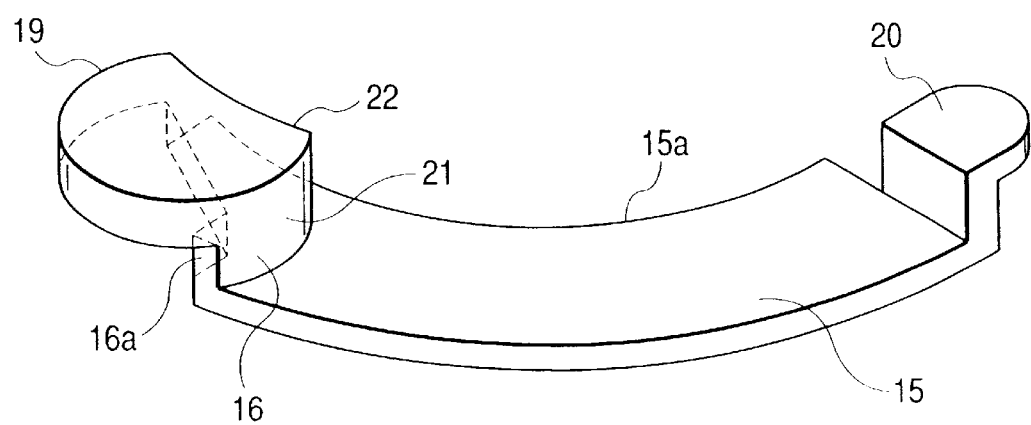
FIG. 4 is a perspective view showing a drive arm of the chucking device for the magnetic disk.
Figure 5:
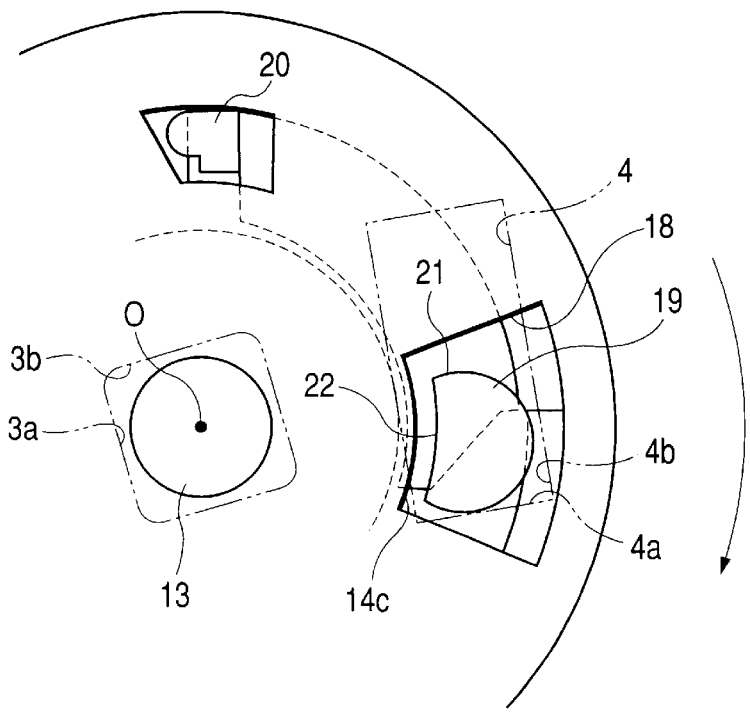
FIG. 5 is a view showing the operation of the chucking device for the magnetic disk in a state in which the drive arm is positioned at a bearing side.

As shown in FIG. 1 and FIGS. 3–4, an inner peripheral surface 15a of the drive arm 15 is made a curved surface along the outer peripheral side surface 31d of the bearing 31. The movement of the inner peripheral surface 15a toward the bearing 31 is restrained by this outer peripheral side surface 31d.

The drive pin 16 passing through the rotor yoke 11 and extending toward the surface side of the rotor yoke 11 is formed at the front part of the drive arm 15. This drive pin 16 loosely passes through the drive pin through hole 14 formed in the rotor yoke 11 and further extends through a cutout hole 25 formed in the magnetic disk 12. The drive pin 16 is loosely inserted into a drive hole 4 formed in the peripheral part of the center hub 2. This drive hole 4 includes a front edge 4a at its front part and an outside edge 4b outward.

The drive arm 15 includes the front flange 19 at the front upper part of the drive pin 16. This front flange 19 comes in contact with a rear edge part 18 of the drive pin through hole 14. At the same time, it can be loosely engaged with a locking flange 14b formed at an outer edge part 14a of the driving pin through hole 14. The locking flange 14b and the front flange 19 are formed such that the engagement of the front flange 19 with the locking flange 14b is kept in a state in which the inner peripheral surface 15a of the drive arm 15 is in contact with the outer peripheral side surface 31d.

At the rear part of the drive arm 15, the rear flange 20 is formed such that it loosely passes through the drive arm receiving hole 17 formed in the rotor yoke 11, extends toward the upper surface of the rotor yoke, and is placed on the upper surface of the rear rotor yoke behind the drive arm receiving hole 17. In this way, the drive arm 15 is loosely suspended from and held by the rotor yoke 11 through the front flange 19, the rear flange 20, and the inner peripheral surface 15a restrained by the outer peripheral side surface 31d.

As shown in FIG. 1, the drive pin through hole 14 of the rotor yoke 11 is formed such that its rear edge part 18 can come in contact with a rear side surface 21 of the drive pin 16. The drive pin 16 is provided with a cutout part 16a. When the rear side surface 21 of the drive pin 16 comes in contact with the rear edge part 18, this cutout part 16b is engaged with the locking flange 14b. The cutout part 16b is engaged with the locking flange 14b, so that the movement of the drive arm 15 toward the front side in the rotation direction is restrained.

Further, as shown in FIG. 1, when the drive arm 15 is shifted toward the outer peripheral side in the rotor rotation direction, an inner edge part 14c of the drive pin through hole 14 can come in contact with a side concave curved surface 22 of the drive pin 16.

As shown in FIGS. 1 and 2, the magnetic disk 12 is provided with the cutout hole 25 having such a shape that the drive pin 16 is not prevented from moving in the drive pin through hole 14. The magnetic disk 12 is also provided with a cutout hole 26 for loosely receiving the rear flange 20. This magnetic disk 12 is magnetically attracted to the upper surface of the rotor yoke, and is irrotationally fitted to the rotor yoke 11 by not-shown bosses and boss holes formed on both sides of the center shaft 13.

Although not shown, that cutout holes are preferably formed in the magnetic disk 12 on a side opposite the cutout holes 25 and 26 across the rotation center O. The rotation balance at the time of rotation of the rotor yoke is kept.

The operation of this chucking device for the magnetic disk will now be described.

As shown in FIG. 1, the drive pin through hole 14 of the rotor yoke 11 is formed such that its rear edge part 18 can come in contact with a rear side surface 21 of the drive pin 16. The drive pin 16 is provided with a cutout part 16a. When the rear side surface 21 of the drive pin 16 comes in contact with the rear edge part 18, this cutout part 16a is engaged with the locking flange 14b. The cutout part 16a is engaged with the locking flange 14b, so that the movement of the drive arm 15 toward the front side in the rotation direction is restrained.

The drive pin 16 protruding upward beyond the magnetic disk 12 may or may not be inserted in the drive hole 4 of the center hub 2. If it is not inserted, the drive pin 16 is pressed from above by the center hub 2, and is pushed to the level of the lower surface of the center hub 2. The depression of this drive pin 16 is enabled since the front part of the drive arm 15 is loosely suspended through the front flange 19.

Here, when a motor (not shown) is started to give at most one turn to the rotor yoke 11 in the D direction, the top of the drive pin 16 slidingly rotates on the lower surface of the center hub reaches the drive hole 4, and is inserted into the drive hole 4. When the rotor yoke 11 is further rotated in the D direction in this state, the drive pin 16 slidingly moves forward in the drive hole 4 and comes in contact with the front edge 4a of the drive hole 4.

Figure 6:
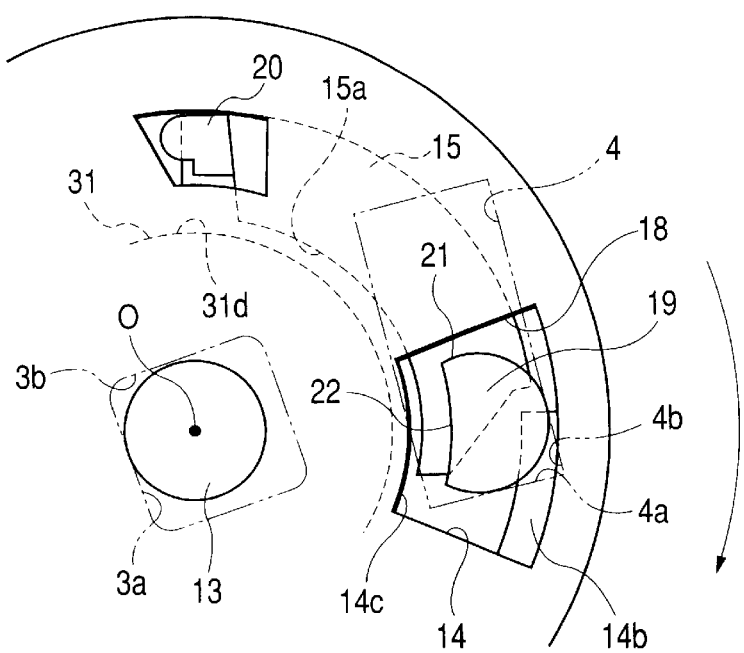
FIG. 6 is a view showing the operation of the chucking device for the magnetic disk in a state in which the drive arm is positioned at an outer peripheral side of a rotor yoke.

Here, the drive pin 16 receives a pressing force from the front edge 4a. Since the drive arm 15 is loosely suspended from the rotor yoke 11, as shown in FIG. 6, it is swung toward the outer peripheral side by the centrifugal force generated by the rotation of the rotor yoke 11, and through this, the drive pin 16 is pressed outward and comes in contact with the outside edge 4b of the drive hole. Because the drive pin 16 is supported by the front edge 4a and the outside edge 4b of the drive hole 4, the "front/outside support" (drive pin comes in contact with the front edge and the outside edge and is supported) is realized.

As the drive arm 15 itself is swung toward the outer peripheral side, the inner peripheral surface 15a of the drive arm 15 comes away from the outer peripheral side 31d of the bearing 31 and is put in a non-contact state with the bearing 31. However, the drive pin 16 is engaged with the locking flange 14b without fail. Through this, the drive arm 15 and the bearing 31 do not slide mutually, and the rotation of the rotor yoke 11 is not hindered. At the same time, the abrasion of the drive arm 15 itself can be prevented. Even if the inner peripheral surface 15a comes away from the bearing 31, there is no risk that the drive arm 15 will fall off from the rotor yoke 11 since the drive pin 16 is engaged with the locking flange 14b without fail.

At this point, the center shaft 13 is supported by the two adjacent sides 3a and 3b of the center hole 3 of the center hub at the side facing the drive pin 16 across the rotation center O. In this state, the center of the recording disk coincides with the rotating shaft O of the rotor yoke 11, and chucking is completed. In this state, the recording disk of the flexible disk is not decentered and can accurately follow the controlled rotation speed of the rotor yoke 11 to rotate.

According to the chucking device for the magnetic disk, since the inner peripheral surface 15a for restraining the drive arm 15 from moving toward the bearing 31 is formed, the drive arm 15 is not largely shifted toward the bearing 31. Even when the drive arm 15 is swung to the outer peripheral side, the drive pin 16 is engaged with the locking flange 14b without fail. Further, since the cutout part 16a to be engaged with the locking flange 14b is formed in the front part of the drive arm 15 in the rotation direction, the movement of the drive arm 15 toward the front side in the rotation direction is restrained. Hence, compared with the conventional chucking device shown in FIG. 7 and FIG. 8, even if the drive arm is not fixed by a fixing pin, there is no risk that the drive arm 15 will fall off from the rotor yoke 11.

Thus, the structure of the drive arm 15 is simple, the assembly is easy, the front/outside support is realized certainly and inexpensively, and decentering of the recording disk can be certainly prevented.

Also, since the inner peripheral surface for restraining the drive arm from moving toward the bearing side is formed at the inner peripheral side of the drive arm, the drive arm is not largely shifted toward the bearing side. Thus, there is no risk that the drive arm will fall off from the rotor yoke although the drive arm is not fixed by a fixing pin.

In addition, when the rotor yoke having the magnetic disk placed thereon is rotated, the drive arm and the bearing do not slide mutually and the rotation of the rotor yoke is not hindered since the inner peripheral surface of the drive arm comes away from the bearing. At the same time, abrasion of the drive arm itself can be prevented.

Further, even if the rotor yoke is rotated and the inner peripheral surface of the drive arm comes away from the outer peripheral side surface, there is no risk that the drive arm will fall off from the rotor yoke since the drive pin is engaged with the locking flange.

According to the chucking device for the magnetic disk of the invention, since the drive arm is suspended from and held by the rotor yoke through the front flange, the rear flange, and the inner peripheral surface, the drive arm is easily swung toward the outer peripheral side by the centrifugal force generated by the rotation of the rotor yoke. This allows the front/outside support to be realized.

In addition, even if the inner peripheral surface of the drive arm is in contact with the outer peripheral side surface, there is no risk that the drive arm will fall off from the rotor yoke since the front flange is engaged with the locking flange.

Furthermore, according to the chucking device for the magnetic disk of the invention, the cutout is formed in front of the drive arm in the rotation direction. This cutout is engaged with the locking flange so the movement of the drive arm toward the front side in the rotation direction is restrained. Thus, the drive arm can be certainly suspended from and held by the rotor yoke, and the drive arm does not fall off from the rotor yoke.

What is claimed is:

1. A chucking device for a magnetic disk, comprising:
   a substantially disk-shaped bearing provided on a surface of a base body and having an outer peripheral side surface;
   a rotor yoke disposed on the bearing and rotating in a constant direction while having a center hub of a magnetic disk placed thereon;
   a center shaft provided from the bearing that passes through a rotation center of the rotor yoke and is loosely inserted into a center hole of the center hub; and
   a drive arm extending in a rear side of the rotor yoke in a circumferential direction and loosely suspended from and held by the rotor yoke at both ends thereof, wherein
   an inner peripheral surface that restrains the drive arm from moving toward the bearing is formed at an inner peripheral side of the drive arm along an outer peripheral side surface of the bearing,
   a drive pin is formed at a front part of the drive arm in a rotor yoke rotation direction, which loosely passes through a drive pin through hole formed in the rotor yoke and extends toward a surface side of the rotor yoke, and is loosely inserted into a drive hole formed at a peripheral part of the center hub and having a front edge at a front part in the rotor yoke rotation direction and an outside edge in a direction away from the rotation center of the rotor yoke,
   a rear edge part of the drive pin through hole allows contact with the drive pin, a locking flange for loosely locking the drive pin is provided at its outer edge part, and
   when the rotor yoke having the magnetic disk placed thereon is rotated, the inner peripheral surface of the drive arm comes away from the outer peripheral side surface, the drive pin is engaged with the locking flange, and the drive pin comes in contact with the front edge and the outside edge of the drive hole.

2. A chucking device for a magnetic disk as set forth in claim 1, wherein the drive arm is suspended from and held by the rotor yoke through a front flange capable of loosely engaging the locking flange of the drive pin through hole, a rear flange formed at a rear part of the drive arm and placed on an upper surface of the rotor yoke behind the drive arm, and the inner peripheral surface restrained by the outer peripheral side surface of the bearing.

3. A chucking device for a magnetic disk as set forth in claim 1, wherein engagement of the front flange with the locking flange is kept in a state where the inner peripheral surface of the drive arm is in contact with the outer peripheral side surface.

4. A chucking device for a magnetic disk as set forth in claim 1, wherein a cutout part is formed at a front side of the drive pin in the rotation direction, the cutout part is engaged with the locking flange, and movement of the drive arm toward the front side in the rotation direction is restrained.

* * * * *